US000001150H

United States Statutory Invention Registration [19]

[11] Reg. Number: H1150

Fritch

[43] Published: Mar. 2, 1993

[54] PARACHUTE RECOVERY SYSTEM FOR PROJECTILES

[75] Inventor: Paul L. Fritch, Mine Hill, N.J.

[73] Assignee: The United States of America as represented by the Secretary of the Army, Washington, D.C.

[21] Appl. No.: 871,158

[22] Filed: Apr. 20, 1992

[51] Int. Cl.[5] ..... F42B 8/12

[52] U.S. Cl. ..... 102/498; 102/293; 102/354; 102/473; 102/529

*Primary Examiner*—Harold J. Tudor

*Attorney, Agent, or Firm*—Anthony T. Lane; Edward Goldberg; Michael Sachs

[57] ABSTRACT

An improved parachute recovery system for a gun fired projectile is disclosed. The projectile has a nose, a payload and a base section. The base section has a hollow cylindrical parachute cannister which is separated from the base section by rearward motion of an internal piston which is actuated by expulsion gas pressure initiated by a time fuze. The parachute cannister is thereby exposed and jettisoned to cause inflation of a parachute attached to the base section so that the parachute floats down in a nose-deployed projectile position for a soft landing and recovery. Also disclosed are alternative embodiments of a projectile base-deployed parachute recovery system.

5 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARACHUTE RECOVERY SYSTEM FOR PROJECTILES

GOVERNMENTAL INTEREST

The invention described herein may be manufactured, used, and licensed by or for the Government for Government purposes without payment to me of any royalties thereon.

BACKGROUND OF THE INVENTION

This invention relates to a parachute recovery system to soft recover a 155 mm or 8 inch projectile that was fired from a rifled cannon.

DESCRIPTION OF THE PRIOR ART

Efforts to develop a parachute recovery system have been underway for a number of years,. However, these early systems had a very low success rate, an excessive weight and very limited gun firing environment capability. Prior art recovery systems used a linear shaped charge to cut the projectile windshield and deploy the parachute. It also used a swivel plate with a heavy steel cable and wear block in order to survive the cutting of the parachute suspension lines by the spinning payload which would turn upside down and rub against the parachute suspension lines.

SUMMARY OF THE INVENTION

Nose-deployed and base-deployed parachute recovery systems are provided. The nose-deployed parachute recovery system is an apparatus that mounts on the forward nose section of an artillery projectile. The base-deployed parachute recovery system is an apparatus that mounts on the rear base section of a projectile.

The novel features of this invention, as well as the invention itself, both as to its organization and operation, will best be understood from the accompanying drawings, taken in conjunction with the accompanying description.

DETAILED DESCRIPTION

Figure 1:
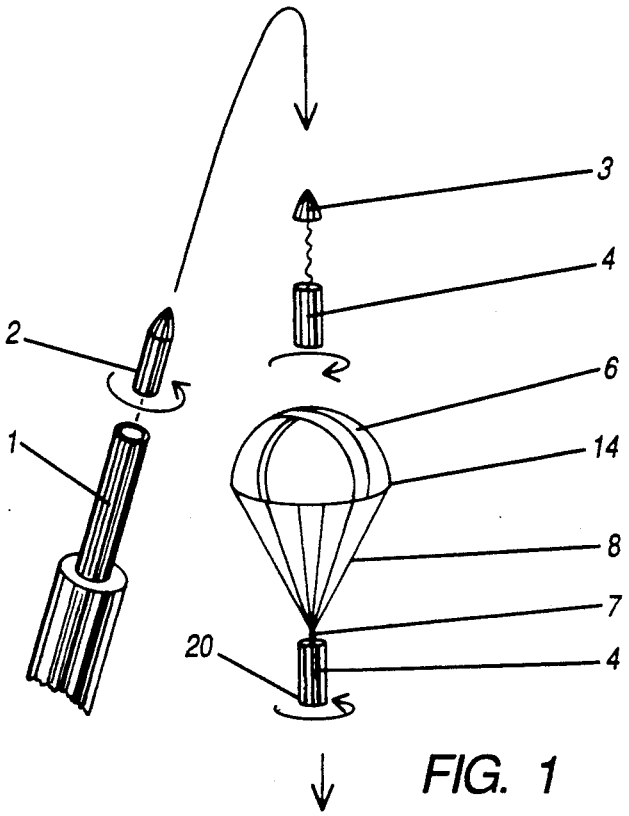
FIG. 1 is a schematic side view of the operation of the nose-deployed parachute recovery system of the present invention.
Figure 2:
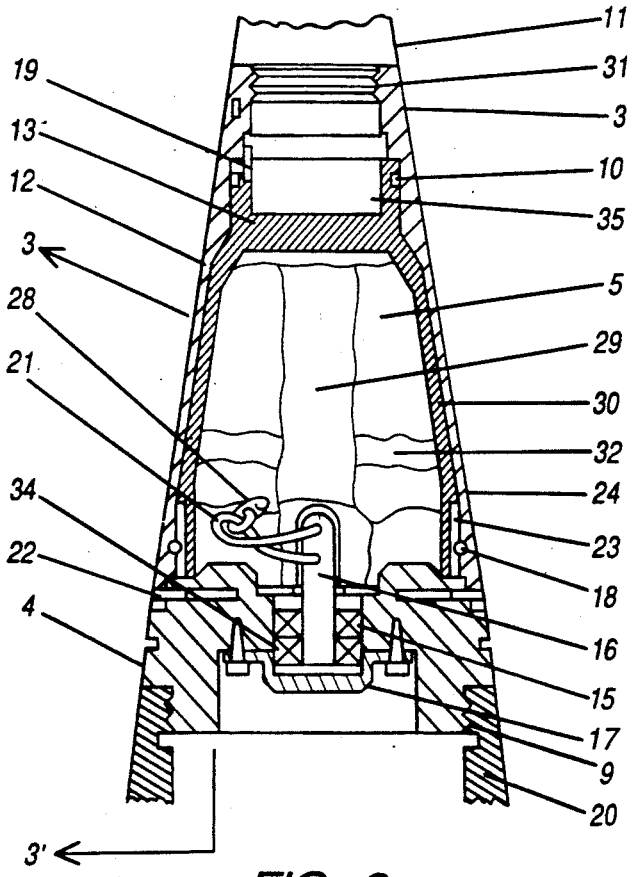
FIG. 2 is a side sectional view of the nose-deployed parachute system of FIG. 1.
Figure 5:
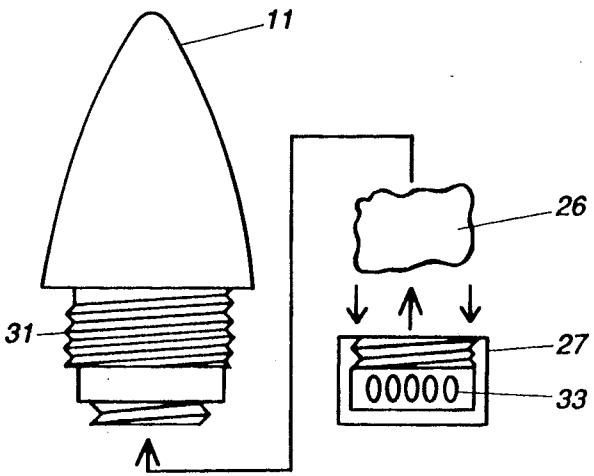
FIG. 5 is a partially exploded view of the time fuze add expulsion charge assembly of FIG. 4.
Figure 4:
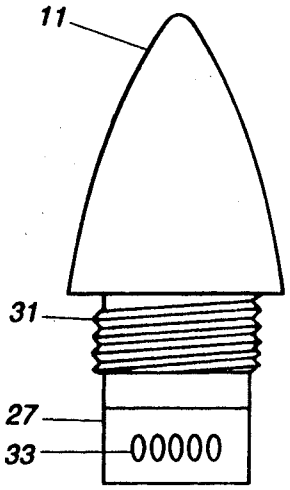
FIG. 4 is a side view of the time fuze and expulsion charge assembly of FIG. 1.
Figure 3:
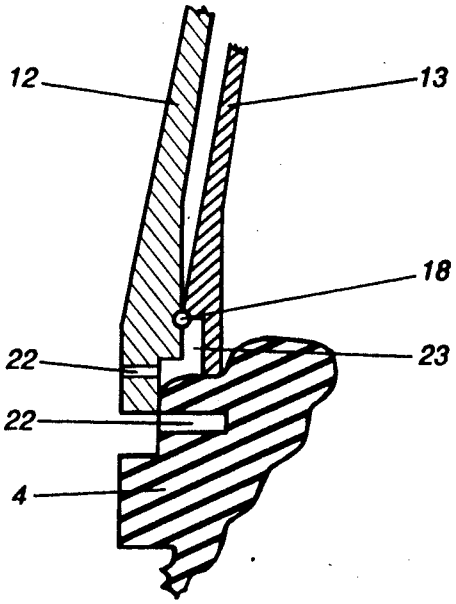
FIG. 3 is a partial sectional view along line 3–3' of FIG. 2 after initiation of an expulsion charge.

Referring to FIGS. 1–5, there is shown the preferred embodiment of the nose-deployed parachute recovery system of the present invention generally designated as projectile 2 which is fired from rifled cannon 1 in a nearly vertical trajectory where drag and gravitational forces slow down the projectile 2 until it reaches its highest point or apogee in its trajectory. Thereafter, the spin stabilized projectile 2 starts to fall back to earth in a nose up attitude. After several seconds of free fall, a time fuze (not shown here) within fuze assembly 11 (FIG. 5) initiates an expulsion charge 26 which generates gas pressure that causes a parachute assembly such as 5 (FIG. 2) to be deployed from the parachute module 30, for instance. The main parachute 14 provides a low velocity, soft landing for the projectile payload 20. The base 4 of the nose-deployed parachute module 30 has a threaded section 9 for attachment to the payload 20.

The base 4 houses at its lower end a duplex bearing 15 encircling the bearing pin 16 which is connected at upper end to parachute assembly 5. The base 4 has a hollow cylindrical parachute cannister 13 above the bearing pin 16 and enclosing the parachute assembly 5. A windshield 12 is attached to the base 4 with a plurality of spring pins 22. The windshield 12 internally houses the parachute cannister 13 which contains the parachute assembly 5. A fuze assembly 11 is mounted to the top of windshield 12 by a standard fuze thread 31. The parachute cannister 13 houses the parachute assembly 5 which consists of a main chute 14 housed in a deployment bag 29 to which a pilot chute 32 is externally attached. The duplex bearing unit 15 consists of a pair of angular contact bearings 34 arranged in a face to face orientation to support the bearing pin 16 during gun launch and parachute descent, and also to decouple the spinning payload 20 from the deployed parachute 14. Bearing pin 16 connects the spinning payload 20 to the parachute assembly 5 by means of a wire loop 21. The bearing pin 16 is shouldered onto the duplex bearing 15 which decouples the spin of the payload 20 from the parachute 14 and supports the thrust load during descent. A duplex bearing retainer (not shown) in the form of a circular plate is bolted to the base 4 to retain the duplex bearing 15 which is housed in the base 4. A wire cable 18 (see FIG. 3) is a length of heavy braided wire rope that is placed in a groove 23 between the windshield 12 and the parachute cannister 13 and is attached to both cannister 13 and to the windshield 12 so that when the windshield 12 is jettisoned the wire cable 18 captures the parachute cannister 13 and it too is jettisoned along with the windshield 12. A dowel pin 19 keys the parachute cannister 13 to the windshield 12 so that the parts can not rotate relative to each other, but a loose fit allows longitudinal movement between the parts. An O-ring 10 provides a gas seal between the parachute cannister 13 and the windshield 12 in close fitting cylindrical sections of the two parts.

The time fuze and expulsion charge assembly 11 (see FIGS. 4 and 5) consists of an artillery time fuze, a prepackaged black powder expulsion charge 26 and a metallic propellant cup 27 which mounts to the bottom of the fuze and houses the expulsion charge 26.

The main parachute 14 (mainchute) provides the slowing of the payload 20 within the terminal velocity required for soft recovery. The mainchute 14 is attached to the bearing pin 16 by the wire rope loop 21. The deployment bag 29 is a double compartmented bag which houses the parachute shroud 6 and parachute suspension lines 8 in separate compartments. The suspension lines 8 in the outer compartment are deployed first thereby releasing a flap closure (not shown) of the inner compartment which contains the parachute shroud 6, which is then deployed to the air-stream. A pilot chute 32 (shown only generally) is a small parachute that is attach to the bottom of the deployment bag 29. The pilot chute inflates when it is exposed to the airstream when the windshield 12 is jettisoned and it aids in the sequential deployment of the mainchute 14 from the deployment bag 29.

The time fuze can be any standard artillery time fuze. The expulsion charge 26 generates gas pressure to separate the windshield 12 and parachute cannister 13 from the base 4 which remains attached to the payload 20. The expulsion charge 26 consists of 10 grams of fine flake black powder which is packaged in a plastic bag. The charge 26 is ignited by the time fuze. The propellant cup 27 houses the expulsion charge 26. It screws onto the bottom (output end) of the time fuze. The propellant cup 27 has a number of vent holes 33 to release the gas pressure generated to the piston area 35 of windshield 12 and parachute cannister 13. The restraining spring pins 22 are made from commercial steel roll pin that is used to hold the windshield 12 to the base 4. The restraining spring pins 22 are sheared when the expulsion charge 26 is ignited by the time fuze.

The payload 20 is the projectile onto which the nose deployed parachute module is attached. A cable crimp 28 is a standard metal swagging sleeve used to attach two sections of the wire rope 21 to the swivel 7 attaching the parachute assembly 5 to the bearing pin 16.

The projectile nose 3 mounts on the forward section of the projectile 2. The time fuze and expulsion charge assembly 26 are included within the nose 3. The projectile 2 is operated by setting the time fuze and ramming the projectile 2 into the gun 1, which is then elevated to the near vertical (87°) quadrant elevation. The gun 1 is then fired which actuates the setback and spin safety detents of the time fuze. The projectile is slowed by air resistance and gravity. As the spinning projectile 2, which is gyroscopically stable, reaches the top of its trajectory (apogee) and starts to fall back towards earth, it will remain in a nose-up attitude due to its gyroscopic stability. After several seconds of freefall (Normally 7–10 seconds) the time fuze functions and ignites the expulsion charge 26 (See FIGS. 1, 4, 5).

The pressure generated by the expulsion charge 26 acts between the inner parachute cannister 13 and the outer windshield 12, causing the windshield 12 to move forward, shearing its restraining spring pins 22. After this short piston-like movement (See FIGS. 2, 3) the windshield 12 captures the parachute cannister by means of the wire cable 18, which was inserted in a groove 23 between the two parts 12, 13 and now catches a shoulder 24 on the parachute cannister 13. The forward momentum of the windshield 12 separates the two parts 12, 13 from the base 4 and the rest of the projectile 2. The separation is positive and clean with no sharp edges or torn metal exposed to the parachute lines 8 or canopy 6. When the windshield 12 and parachute cannister 15 are jettisoned, the parachute assembly is exposed to the windstream. As mentioned earlier, the main chute 14 is stored in a deployment bag 29 to which a pilot chute 32 is externally attached. The mainchute 14 is attached to the bearing pin 16 on the parachute module 30 by means of a wire rope loop 21 and cable crimp 28. The aerodynamic forces on the deployment bag 29 and pilot chute 32 pull the suspension lines 8 first, and then open the parachute canopy (shroud) 6 from the double compartmented deployment bag 29. The mainchute 14 is now fully open and the spin of the suspended payload 20 is decoupled from the mainchute 14 by the duplex bearing 15. The parachute retarded descent of the payload 20 is relatively slow and provides a soft recovery for the payload 20.

An alternative embodiment of the invention is an 8 inch projectile base-deployed parachute recovery system as shown in FIGS. 6–7A and 8–10. This embodiment consists of an 8 inch projectile base section 704 and a parachute assembly section 709 to which a nose mounted payload 720 is attached. This embodiment contains two separate time fuzes and corresponding expulsion charges, (see FIG. 10, e.g.). Time fuze 705 causes the separation and jettison of the base section 704, shown as event B on FIG. 6. The second time fuze 721 causes a parachute 706 to be deployed from base of the parachute assembly section 707, shown as event C on FIG. 6. Thereafter, the parachute assembly section 707 (with the parachute 706 deployed) and the payload 720 are decelerated for a nose-first recovery.

The 8 inch projectile body section 704 is made from a M650 rocket motor 711 which is torqued to a modified M650 body section 704. The body section 704 contains a rear fuze housing 703 which contains the rear fuze assembly 705 and houses the parachute assembly section 707, which is attached by several shear pins 709 and torque pins 710 for torque transmission during projectile spin-up during launch by the gun 701. The body section 704 is modified to accept the rear fuze housing 703 at the body section's rear bulkhead 13. The body 704 is cut off to provide a cylindrical cavity 712 to house the parachute assembly section 707 that is attached to the body section 704 with several shear pins 709 and torque pins 710. The rear fuze housing 703 houses the rear fuze assembly 705 and directs the gas pressure generated by the rear fuze expulsion charge 715 against the parachute assembly base plug 716 which causes the body section 704 to be jettisoned. The fuze assembly contains a time fuze, a propellant cup 718, and the expulsion charge 715, which is a sealed plastic bag containing several grams of black powder. The expulsion charge 715 is initiated by the time fuze and generates gas pressure to cause separation of the body section 704 from the parachute assembly section 707 and payload 720. The propellant cup 718 (see FIG. 10) screws onto the bottom (output end) of the time fuze, houses the expulsion charge 715, and has a number of vent holes 719 to release the gas pressure generated by the expulsion charge 715. The shear pins are 7/32 inch diameter steel roll pins that hold the parachute assembly section 707 to the body section 704. The shear pins 709 are sheared when the expulsion charge 715 is initiated by the time fuze at the separation of the base 704, event B in FIG. 6. The torque pins 710 are 5/16 diameter solid steel dowel pins that take the torsional load between the body section 704 and the parachute assembly section 707 and payload 720 during the launch by the gun 701.

Figure 6:
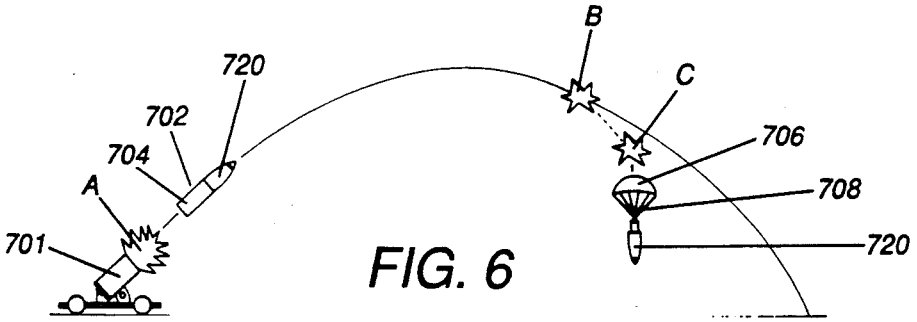
FIG. 6 is a schematic side view of the operation of the base-deployed parachute recovery system of the present invention.
Figure 7:
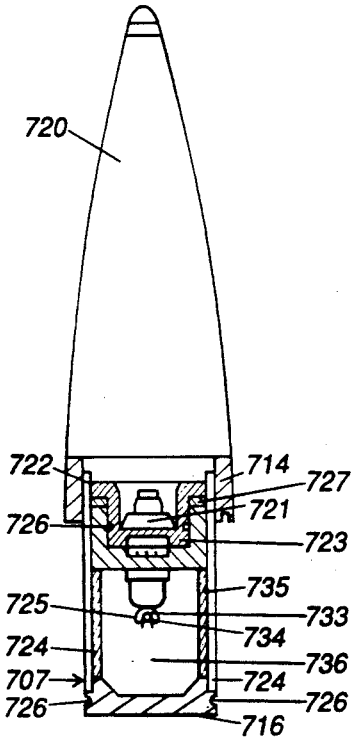
FIGS. 7 and 7A show respectively a partial section and partially exploded view base-deployed parachute module of FIG. 6.
Figure 7A:
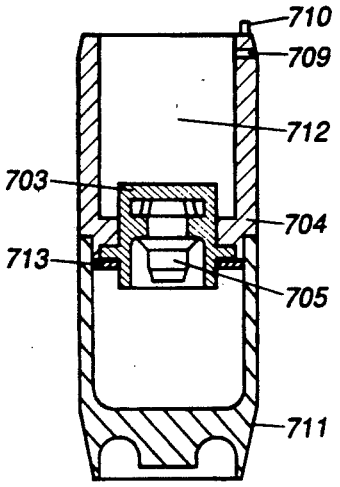
Figure 8:
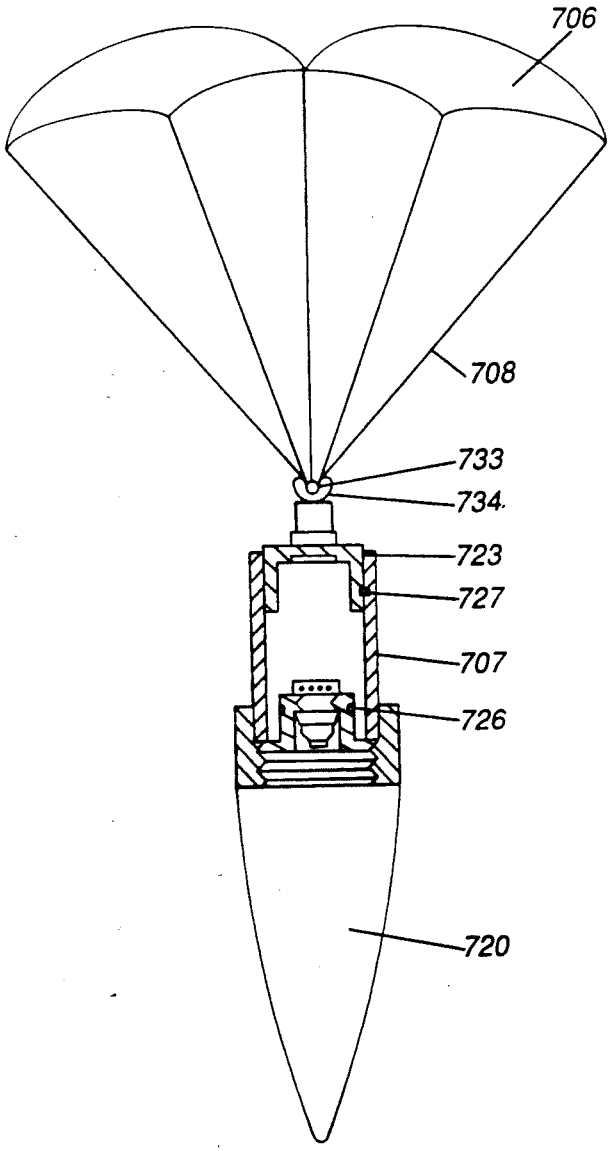
FIG. 8 is a partially schematic side view of the base-deployed module of FIGS. 7 and 7A with the parachute is deployed position.
Figure 9:
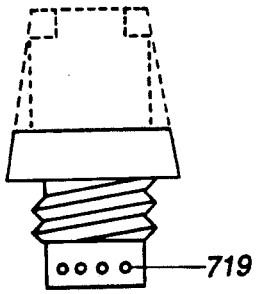
FIG. 9 is a side view of the fuze assembly of the base-deployed parachute module.
Figure 10:
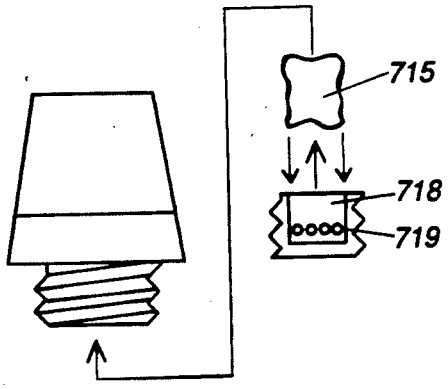
FIG. 10 is an exploded side view of the fuze assembly of FIG. 9.

The torque pins 710 have a slide fit and do not hinder the separation of the base 704, event B in FIG. 6. The parachute assembly section 707 (see FIG. 7) contains all of the working parts for deployment of the parachute 706, namely: the parachute assembly housing 714, the forward fuze assembly, housing 722, the forward piston 723, a pair of split ring supports 724, the parachute bearing/swivel assembly 725, the parachute assembly base plug 716, O-ring seals 726, and stop pins 727. The parachute 706 is deployed from the rear end of the parachute assembly section when the forward fuze expulsion charge 715 is initiated by the forward time fuze at the deployment of the parachute 706, event C in FIG. 6. The parachute assembly housing 714 is the main structure that mounts to the payload 720, and which houses the parachute 706 and parachute deployment mechanism. The forward fuze assembly (see FIGS. 9 and 10) contains a forward time fuze, and a propellant cup (same as 18). The expulsion charge 715 is initiated by the time fuze output in generating the gas pressure that drives the piston 723 rearward and causes the parachute assembly base plug 716 and the split ring supports 724 to be jettisoned and the parachute 706 to be deployed (see FIG. 8).

The forward propellant cup houses the forward expulsion charge 715. The forward fuze housing 722 is an annular structure that screws into the forward end of the parachute assembly housing 714 and fits into the piston 723 where O-ring 726 provides a gas seal. The bearing/swivel assembly 734 to which the parachute 706 is attached, is mounted to the closed end of the piston 723. The piston 723 has 3 equally spaced stop pins 727 which ride in 3 grooves 735 in the parachute assembly housing 714. Pressure generated by the expulsion charge 715 drives the piston 723 rearward, ejecting the parachute assembly base plug 716 and 4 split ring supports 724 to deploy the parachute 706. The stop pins 727 stop the piston 723 at the rearward end of the parachute assembly housing 714. The split ring supports 724 are half sections of a thick walled hollow cylinder which are stacked to form a cylindrical cavity 736 which houses the parachute 706. Split ring supports 724 are also used to form the stack. This stack rests on the parachute assembly base plug 716 and it supports the piston 731 during gun 701 launch. The split ring supports 724 are jettisoned during deployment of the parachute 706, by flying off radially as they leave the spinning parachute assembly section 707. The parachute assembly consists of a 3½ foot diameter vortex ring parachute 706 stowed in a nylon bag (not shown). The parachute is attached by means of a spring pin 733 to the bearing/swivel assembly 734 which is attached to the forward piston 723. The spring pin 733 is a heavy duty 3/8 inch diameter commercial roll pin that is used to connect the looped end of the parachute suspension lines 708 to the flared end of the swivel 734. The parachute assembly base plug 716 is press fit into the rear cylindrical section of the parachute assembly housing 714. The base plug 716 has an O-ring 726 on its outside diameter to provide a gas seal between the base plug 716 and the cylindrical wall section of the body 704. The gas pressure generated at the separation of the base 704 (event B in FIG. 6) is supported by the base plug 16 and the O-ring 726. At the deployment of the parachute 706 (event C in FIG. 6) the base plug 16 and the split ring supports 724 are jettisoned.

Figure 11:
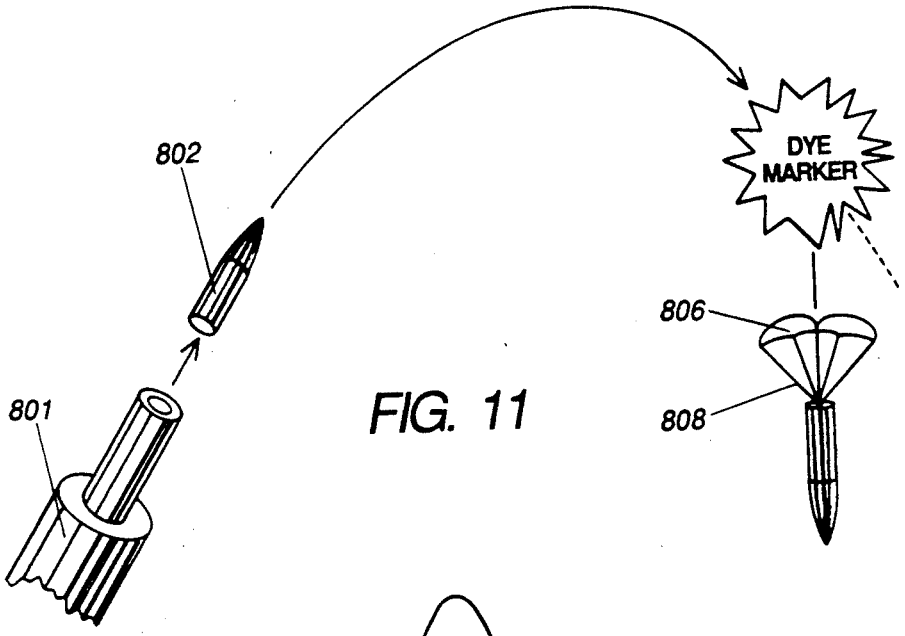
FIG. 11 is a schematic side view of the operation of an alternative embodiment of the base-deployed parachute recovery system of the present invention.
Figure 12:
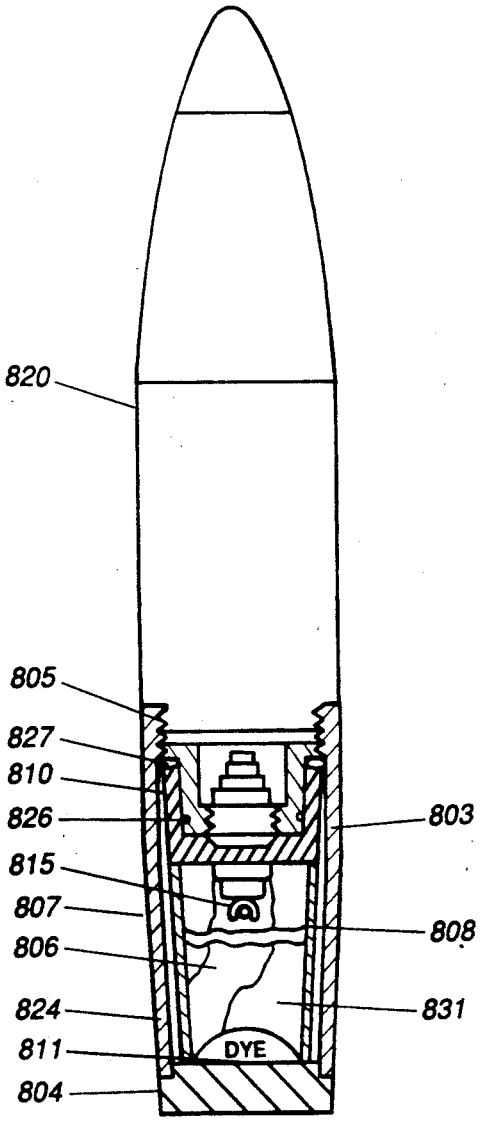
FIG. 12 is a side sectional view of the base-deployed parachute module of FIG. 11.
Figure 13:
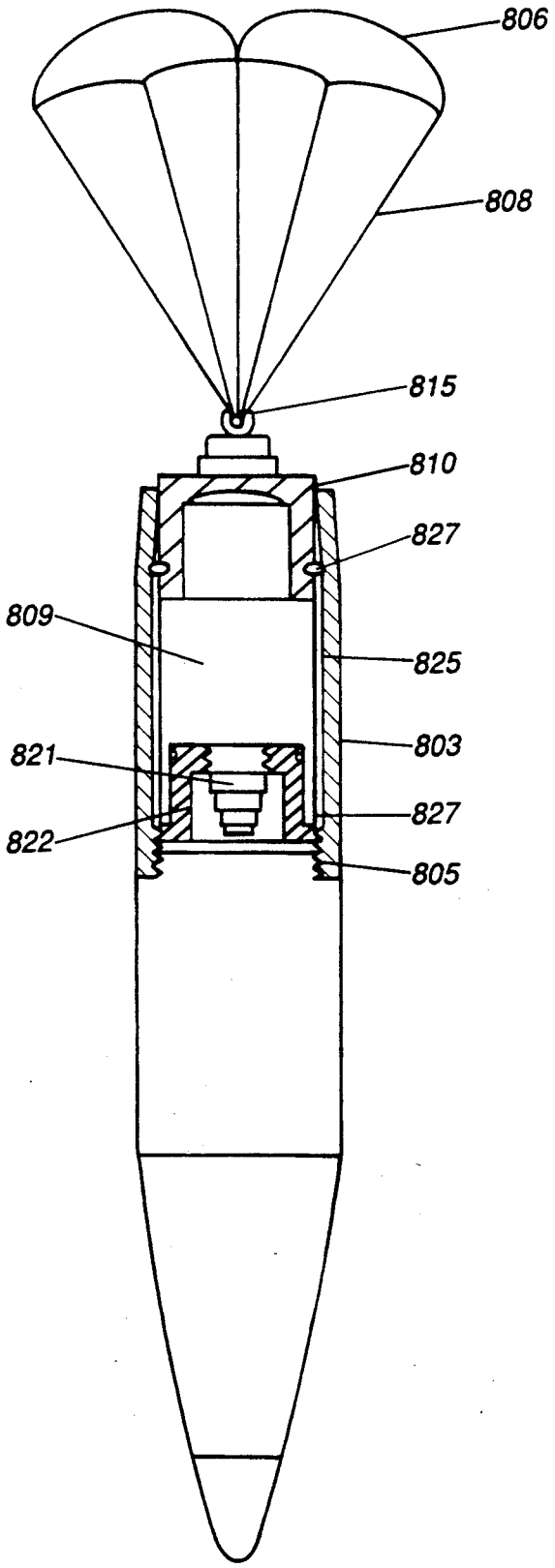
FIG. 13 is a partially schematic side view of the base-deployed parachute module of FIG. 11.

Another alternative embodiment of the invention is shown in FIGS. 11–13 disclosing a 155 millimeter projectile base deployed parachute recovery system, that would enable gun firing of a nose mounted payload (such as a complete radar fuze and telemetry package) and then provide soft recovery of the payload without altering the in-flight condition or normal mode of operation.

The body 803 is a modified body section of a M485 illuminating projectile 802 having a cylindrical cross section and a pressed on base plug 804 at its rear end. The body 803 has a circumferential screw thread 805 at its forward end for attachment of the payload 20. The base plug 804 supports the breech chamber pressure when the projectile 2 is fired from the gun 801 and seals this pressure from entering the projectile 2. A piston 810 is a thick walled cylinder closed at its rear end and movable axially within the hollow cylinder 809 (see FIG. 13) of the body 803. A bearing/swivel assembly 815 is mounted to the center of the rear closed end of the piston 810. The open end of the piston 810 fits over and encloses the fuze housing 822. The piston 810 has equally spaced stop pins 827 on its outer periphery which ride in 803 grooves 825 axially along the inside hollow cylinder of body 803. Pressure generated by an expulsion charge, like 715 (see FIG. 10) drives the piston 810 rearward, ejecting the base plug 804 and split ring supports 824 to deploy the parachute 806. The stop pins 827 stop the piston 810 at the rearward end of the body 804.

The fuze housing 822 screws into the forward end of the body 803, and it fits into the piston 810 where an O-ring 826 provides a gas seal. A fuze assembly 821 screws into the center of the fuze housing 822 at the forward end of the body 803. Split ring supports 824 are half sections of a thick walled hollow cylinder which are stacked to form a cylindrical cavity 831 within the body 803 to house the parachute assembly section 807. This stack rests on the base plug 804. When an expulsion such as 715 is initiated, the gas pressure drives the piston 810 rearward against the stack of split ring supports 824 which, in turn, pushes out the base plug 804. The split ring supports 824 fly off radially from the spinning projectile 802 and are jettisoned. This causes the parachute 806 to be deployed from the rear of the body 803. The parachute 806 slows down the projectile 803 for a nose-first soft recovery.

It is to be understood that the above description and the accompanying drawings are merely illustrative of the preferred embodiments of the parachute recovery system for projectiles of the present invention, and that no limitations are intended other than as defined in the appended claims.

What is claimed is:

1. An improved parachute recovery system for a gun fired, spin stabilized, artillery projectile having:

a payload at the rear end of said projectile;

a conical nose at the forward end of said projectile;

said nose being a nose-deployed parachute recovery module consisting of;

a base that is threadably attached to the said payload;

a hollow conical windshield that is pinned to the said base with frangible shear pins, said windshield enclosing a hollow conical parachute canister which houses a parachute assembly;

a time fuze threadably mounted to the forward end of said windshield;

wherein the improvement comprises:

a cylindrical piston area formed between close fitting cylindrical sections at the forward end of said windshield and said parachute canister and located below said time fuze; whereby said piston area is pressurized by expulsion gas pressure from a expulsion charge initiated by said time fuze; whereby said windshield is moved forward, shearing the said shear pins and is jettisoned from said projectile; whereby said jettisoned windshield captures the said parachute canister and jettisons it also; whereby said jettison of said parachute canister causes exposure of a parachute deployment bag assembly to the windstream; whereby a parachute is deployed from the said deployment bag; whereby said parachute is decoupled from said spinning projectile payload by a ball bearing swivel that is mounted in said base; whereby said parachute and payload floats down in a projectile nose-up position for a soft landing and recovery.

2. An improved parachute recovery system for a gun fired projectile having:

a payload mounted at forward end of said projectile; and with rear end of said payload threadably attached to a cylindrical parachute assembly housing; whereby said parachute assembly housing fits within a cylindrical cavity in a rear body section of said projectile and is attached to it with frangible shear pins;

a rear fuze mounted internally within said rear body section at bottom closure of said cylindrical cavity;

a forward fuze mounted internally within said parachute assembly housing at its forward end behind said payload; said parachute assembly housing having an internal piston at its forward end behind said forward fuze and said housing having a base plug press fitted into its rear end adjoining said rear fuze; said housing encloses a parachute which is attached to said piston with a ball bearing swivel;

wherein the improvement comprises:

said housing and said payload being separated from said rear body section by expulsion gas pressure initiated by said rear fuze; and said base plug and said parachute within said housing being ejected from said housing by rearward movement of said piston by expulsion gas pressure initiated by said forward fuze so as to deploy said parachute attached to said piston restrained within said housing by means of stop pins attached to the periphery of said piston; whereby said parachute and said payload floats down in a projectile nose-down position for a soft landing and recovery.

3. The parachute recovery system of claim 2 wherein the projectile is an 8 inch, spin stabilized, projectile.

4. An improved parachute recovery system for a gun fired projectile having:

a payload mounted at the forward end of said projectile;

a body section mounted to and in threaded connection with the rear end of said payload;

a cylindrical cavity within said body section; said cavity being closed at the rear end by a press fitted base plug; said cavity being closed at the forward end by a time fuze behind said payload; said cavity having an internal piston near its forward end and behind said fuze; and a parachute contained within said cavity between said base plug and said piston;

said base plug and said parachute being ejected from said body section by rearward motion of said piston by expulsion gas pressure initiated by said fuze so as to deploy said parachute attached to said piston restrained within said body section by means of stop pins attached to the periphery of said piston; whereby said parachute and said payload floats down in a projectile nose-down position for a soft landing and recovery.

5. The parachute recovery system of claim 4 wherein the projectile is a 155 millimeter, spin-stabilized, projectile.

* * * * *